United States Patent
Ye et al.

(10) Patent No.: US 12,535,899 B2
(45) Date of Patent: Jan. 27, 2026

(54) TOUCHPAD ASSEMBLY

(71) Applicant: TPK Advanced Solutions Inc., Fujian (CN)

(72) Inventors: Cai-Jin Ye, Xiamen (CN); Tsai-Kuei Wei, Hsinchu County (TW); Wei-Yi Lin, Taoyuan (TW); Chen-Hsin Chang, Taoyuan (TW); Dong-Yi Huang, Taipei (TW)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 18/789,899

(22) Filed: Jul. 31, 2024

(65) Prior Publication Data
US 2025/0060842 A1  Feb. 20, 2025

(30) Foreign Application Priority Data

Aug. 14, 2023 (CN) .......................... 202311017585.3

(51) Int. Cl.
*G06F 3/0354* (2013.01)
*G06F 1/16* (2006.01)
*G06F 3/01* (2006.01)

(52) U.S. Cl.
CPC .......... *G06F 3/03547* (2013.01); *G06F 1/169* (2013.01); *G06F 3/016* (2013.01)

(58) Field of Classification Search
CPC ....... G06F 3/03547; G06F 1/169; G06F 3/016
See application file for complete search history.

(56) References Cited

U.S. PATENT DOCUMENTS

| | | | |
|---|---|---|---|
| 11,842,003 B1* | 12/2023 | Chin-Chung | G06F 3/03547 |
| 2013/0307803 A1 | 11/2013 | Koga et al. | |
| 2014/0071086 A1* | 3/2014 | Lee | G06F 3/016 |
| | | | 345/174 |
| 2018/0081479 A1* | 3/2018 | Kravets | G06F 1/1637 |
| 2020/0133397 A1* | 4/2020 | Mori | G06F 3/016 |
| 2023/0004225 A1 | 1/2023 | Orita et al. | |
| 2023/0266829 A1* | 8/2023 | Sathe | G06F 3/0202 |
| | | | 345/168 |
| 2025/0112535 A1* | 4/2025 | Umehara | H02K 5/225 |

FOREIGN PATENT DOCUMENTS

| | | | | |
|---|---|---|---|---|
| CN | 107025017 B | | 5/2021 | |
| CN | 119105641 A | * | 12/2024 | ........... G06F 3/0412 |
| TW | 201812265 A | | 4/2018 | |
| TW | 202228443 A | | 7/2022 | |

* cited by examiner

*Primary Examiner* — Julie Anne Watko
(74) *Attorney, Agent, or Firm* — Cooper Legal Group, LLC

(57) ABSTRACT

A touchpad assembly comprises a cover plate, a touch circuit board, a carrying mechanism, a magnet group, and vibration isolators. The touch circuit board is disposed under the cover plate and comprises a first touch electrode layer, a second touch electrode layer, and a single-layer embedded coil layer. The carrying mechanism has a central accommodating portion. The magnet group is disposed in the central accommodating portion and constitutes a vibration module with the single-layer embedded coil layer. A pressing gap is formed between the touch circuit board and the magnet group. The vibration isolators are disposed between the touch circuit board and the carrying mechanism.

13 Claims, 16 Drawing Sheets

TOUCHPAD ASSEMBLY

CROSS-REFERENCE TO RELATED APPLICATION

The instant application claims priority to China Patent Application 202311017585.3, filed on Aug. 14, 2023, which is incorporated herein by reference.

BACKGROUND OF THE DISCLOSURE

Field of Disclosure

The present disclosure relates to a touchpad assembly.

Description of Related Art

The current development trend of touchpad assemblies is the advancement from merely a touch function to an integration of touch, force sensing, and haptic feedback. A touchpad assembly of the prior art installs a force sensor on an elastic component (such as a metal frame) and then mounts the elastic component to a printed touch circuit board. See, for example, those described in China Patent Application No. 107025017B. However, these assemblies of the prior art may have disadvantages such as large amount of elements, complex assembly processes, higher overall costs, and greater overall thickness.

Therefore, the solution to tackle the aforementioned disadvantages of touchpad assemblies is a major focus that the industry desperately needs and will invest its research and development resources in.

SUMMARY

In view of this, an objective of the present disclosure is to provide solutions to the aforementioned problems regarding these touchpad assemblies.

To achieve the aforementioned objective, a touchpad assembly comprises a cover plate, a touch circuit board, a carrying mechanism, a magnet group, and a plurality of vibration isolators, based on one embodiment of the present disclosure. The touch circuit board is disposed under the cover plate and comprises a first touch electrode layer, a second touch electrode layer, and a single-layer embedded coil layer disposed away from the cover plate. The carrying mechanism has a central accommodating portion. The magnet group is disposed in the central accommodating portion and constitutes a vibration module together with the single-layer embedded coil layer. A pressing gap is formed between the touch circuit board and the magnet group. The vibration isolators are disposed between the touch circuit board and the carrying mechanism. A maximum press-down deformation is from 0.3 mm to 0.7 mm, when the central area of the cover plate is pressed The vibration module is configured to generate a vibration acceleration from 2G to 15G. A total thickness of the touchpad assembly is from 2.5 mm to 3.5 mm.

In one or several embodiments of the present disclosure, the carrying mechanism comprises a first carrying part and a second carrying part. The first carrying part has a through-hole. The second carrying part covers the through-hole and is away from an opening of the touch circuit board. The central accommodating portion is composed of the through-hole and the second carrying part.

In one or several embodiments of the present disclosure, the first carrying part has a first thickness. The second carrying part has a second thickness. The first thickness is larger than the second thickness.

In one or several embodiments of the present disclosure, the first thickness is from 0.45 mm to 0.55 mm.

In one or several embodiments of the present disclosure, the second thickness is from 0.25 mm to 0.35 mm.

In one or several embodiments of the present disclosure, a material of the second carrying part comprises silicon steel.

In one or several embodiments of the present disclosure, an upper critical value of the second thickness of the second carrying part is less than or equal to 0.5 mm.

In one or several embodiments of the present disclosure, the vibration acceleration ranges from 3.5G to 15G.

In one or several embodiments of the present disclosure, the vibration acceleration ranges from 8G to 15G.

In one or several embodiments of the present disclosure, a height of each of the plurality of vibration isolators is from 0.55 mm to 0.95 mm.

In one or several embodiments of the present disclosure, a non-contact load capacity between the single-layer embedded coil layer and the magnet group is larger than 110 gf.

In one or several embodiments of the present disclosure, the touch circuit board comprises no more than 5 layers of metal layers.

In one or several embodiments of the present disclosure, the single-layer embedded coil layer comprises two coil units and the touch circuit board further comprises a shielding layer. The shielding layer is located between the second touch electrode layer and the single-layer embedded coil layer. The two coil units are electrically connected through the shielding layer.

In summary, in the touchpad assembly of the present disclosure, the total thickness of the touchpad assembly can be effectively reduced, owing to the fact that the single-layer embedded coil layer, disposed on the touch circuit board, and the magnet group, disposed on the carrying mechanism, can provide a method of dividing the pressing gap. The single-layer embedded coil layer and the magnet group further constitute a vibration module. The total thickness of the touchpad assembly can further be reduced, owing to the magnet group disposed in the central accommodating portion of the carrying mechanism. Through an appropriate design that copes with the maximum press-down deformation range when the central area of the cover plate is pressed, as well as the vibration acceleration range generated by the vibration module, an excellent balance can be achieved between thinning the touchpad assembly while meeting the required measurement of vibration detection. In other words, the use of a silicon steel plate, having an upper critical thickness (that is, less than or equal to 0.5 mm) not only can manage thinning the touchpad assembly but also achieve an excellent effect of vibration acceleration (that is, configured with a vibration module to generate excellent effect of vibration acceleration).

The aforementioned statements are used to explain problems that can be solved by the present disclosure, the technical means for solving the problems, and the effect thereof. The present disclosure will become more fully understood from the detailed descriptions given herein below, by means of embodiments with reference to the accompanying drawings for illustration.

BRIEF DESCRIPTION OF THE DRAWINGS

To better understand the aforementioned objective and other objectives, novel features, advantages, embodiments, and the effect of the present disclosure, relevant diagrams are provided as follows.

DETAILED DESCRIPTION

Figure 1:
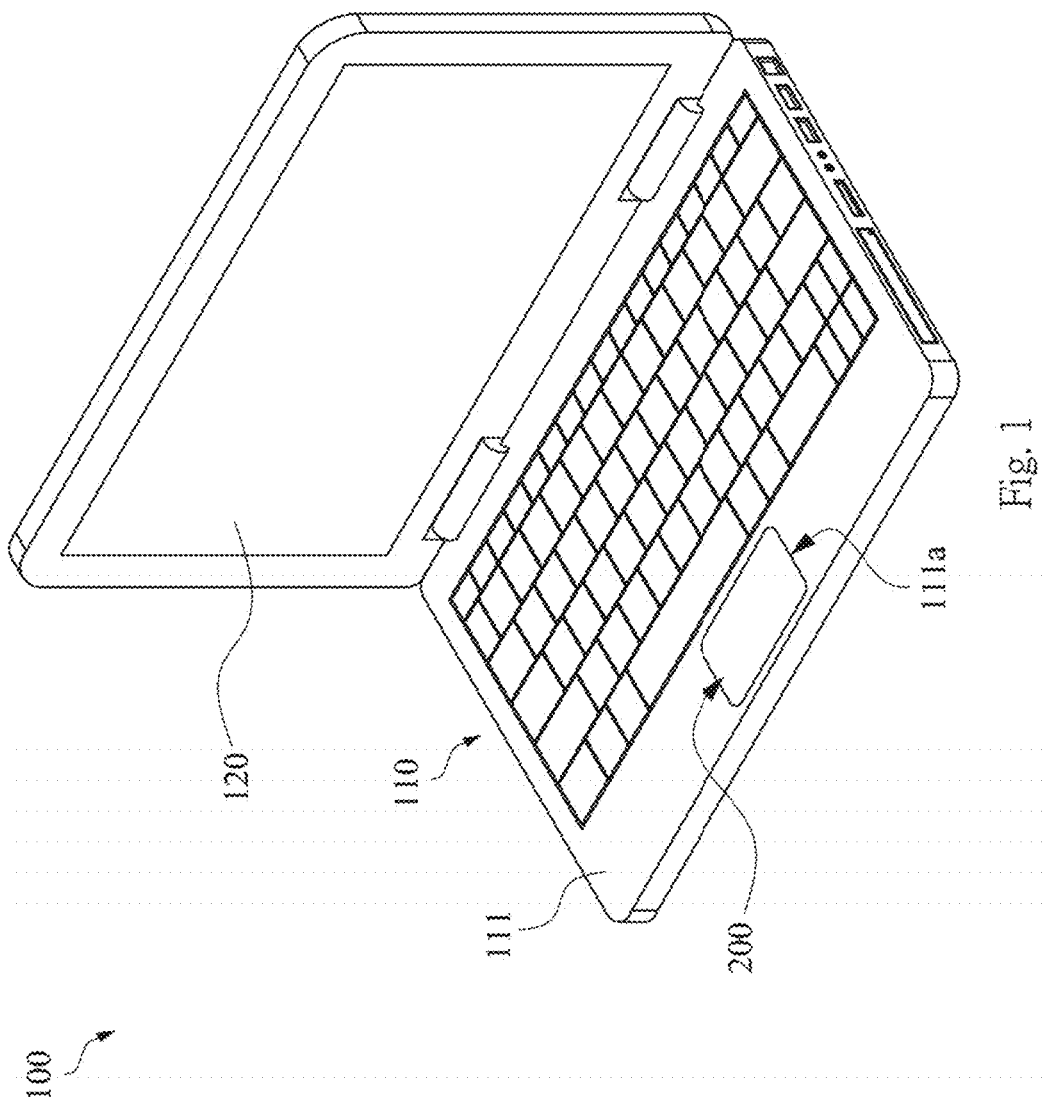
FIG. 1 is a schematic diagram showing an electronic device of an embodiment of the present disclosure.

A plurality of embodiments of the present disclosure will be disclosed below with reference to drawings. For the purpose of clear illustration, many details in practice will be described together with the following descriptions. However, these detailed descriptions in practice are for illustration only, which should not be interpreted to limit the scope, applicability, or configuration of the present disclosure in any way. That is, in some embodiments of the present disclosure, these details in practice are not necessarily required. Furthermore, for purpose of simplifying drawings, some structures and components of the prior art shown in the drawings will be illustrated schematically.

Please refer to FIG. 1 which is a schematic diagram of an electronic device 100 of an embodiment of the present disclosure. In the embodiment illustrated in FIG. 1, the electronic device 100 comprises a host computer 110, a monitor 120, and a touchpad assembly 200. The touchpad assembly 200 is disposed in the host computer 110 and is exposed through the opening 111a of the casing part 111 (also known as a cover) of the host computer 110. The touchpad assembly 200 can be an input device that is disposed in the host computer 110. However, the present disclosure is not limited thereto. Furthermore, the rectangular area of the touchpad assembly 200 is demarcated by the length and width thereof, in which the distance between both ends can be adjusted to be wider in response to different machine types (that is, a longer touchpad assembly 200); however, the dimension thereof is not limited to that illustrated in FIG. 1. In practical implementations, the touchpad assembly 200 can also be an electronic device (for example, personal digital assistant, keyboard that includes a touchpad, etc.) using the touchpad as an input method or operation interface. In other words, the concept of the touchpad assembly 200 of the present disclosure applies to any electronic device using a touchpad as an input method or operation interface. Detailed descriptions of the structures and functions of some elements of the touchpad assembly 200, and the connections and associated operations among these elements are provided in the following paragraphs.

Figure 2:
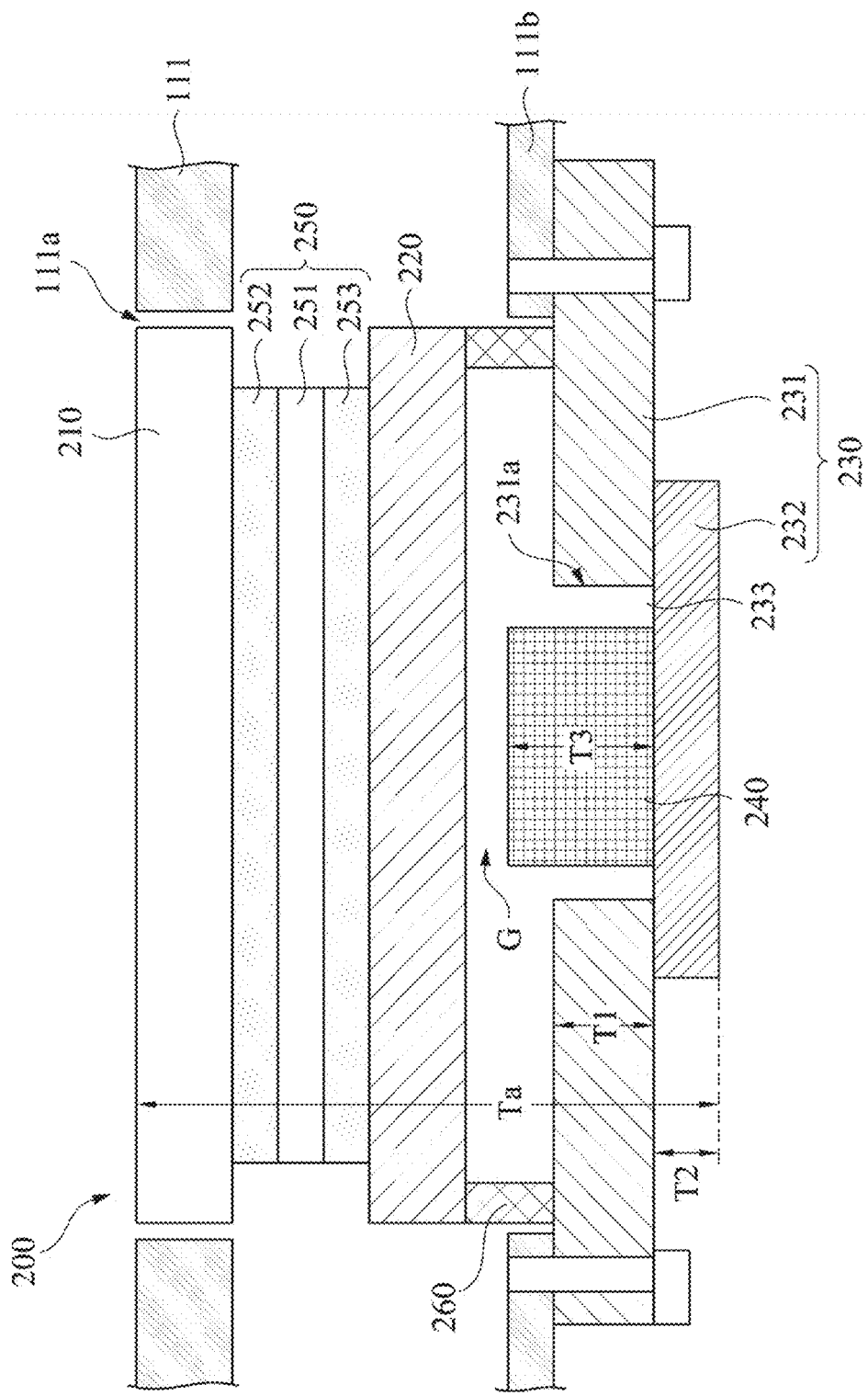
FIG. 2 is a cross-sectional schematic diagram showing the touchpad assembly of FIG. 1.

Please refer to FIG. 2. FIG. 2 is a cross-sectional schematic diagram showing the touchpad assembly 200 of FIG. 1. In the embodiment illustrated in FIG. 2, the touchpad assembly 200 comprises a cover plate 210, a touch circuit board 220, a carrying mechanism 230, a magnet group 240, a force-supporting component 250, and a plurality of vibration isolators 260. The touch circuit board 220 is disposed under the cover plate 210. More specifically, the touch circuit board 220 is connected to the cover plate 210 from below, through the force-supporting component 250. The carrying mechanism 230 is disposed under the touch circuit board 220 and mounted to an internal component 111b (for example, through a screw) inside the casing part 111. The magnet group 240 is disposed on the carrying mechanism 230 and faces the touch circuit board 220. In other words, the magnet group 240 is located between the carrying mechanism 230 and the touch circuit board 220. The vibration isolators 260 are disposed between the touch circuit board 220 and the carrying mechanism 230. The vibration isolators 260 are configured to reduce the vibration noise and effectively release the vibration stress in the horizontal direction.

In the embodiment illustrated in FIG. 2, the force-supporting component 250 is a stacked layer structure. The stacked layer structure comprises two pressure sensitive adhesive layers (PSA layers) 252, 253 and a plastic layer 251, located between the PSA layers 252, 253. The PSA layers 252, 253 are in contact with the cover plate 210 and the touch circuit board 220 respectively. In several embodiments, the material of the plastic layer 251 comprise polyethylene terephthalate (PET). However, the present disclosure is not limited thereto.

In other embodiments, the force-supporting component 250 can be a single layer structure, and the material of the force-supporting component 250 comprises silica gel. However, the present disclosure is not limited thereto.

In the embodiment illustrated in FIG. 2, the carrying mechanism 230 has a central accommodating portion 233. The magnet group 240 is disposed in the central accommo-dating portion 233. Owing to such arrangements, the distance between the carrying mechanism 230 and the touch circuit board 220 can be reduced. As a result, the total thickness "Ta" of the touchpad assembly 200 can be further reduced to a range from 2.5 mm to 3.5 mm.

More specifically, as shown in FIG. 2, the carrying mechanism 230 comprises a first carrying part 231 and a second carrying part 232. The first carrying part 231 has a shape of a plate and includes a through-hole 231a. The second carrying part 232 covers the through-hole 231a from the end away from the opening of the touch circuit board 220 (that is, covering the lower opening of the through-hole 231a). The central accommodating portion 233 is formed by the through-hole 231a and the second carrying part 232.

In several embodiments, the first carrying part 231 has a first thickness T1. The second carrying part 232 has a second thickness T2. The first thickness T1 is larger than the second thickness T2.

In several embodiments, the first thickness T1 of the first carrying part 231 is from 0.45 mm to 0.55 mm. The first thickness T1 can be configured together with that of the magnet group 240 in design. For example, the thickness of the magnet group 240 is equal to or slightly larger than the first thickness T1. Preferably, when the thickness of the magnet group 240 is equal to the first thickness T1, the setting gains a good accommodating effect that can effectively control the thinning of the thickness.

In several embodiments, the second thickness T2 of the second carrying part 232 is from 0.25 mm to 0.35 mm.

Figure 3:
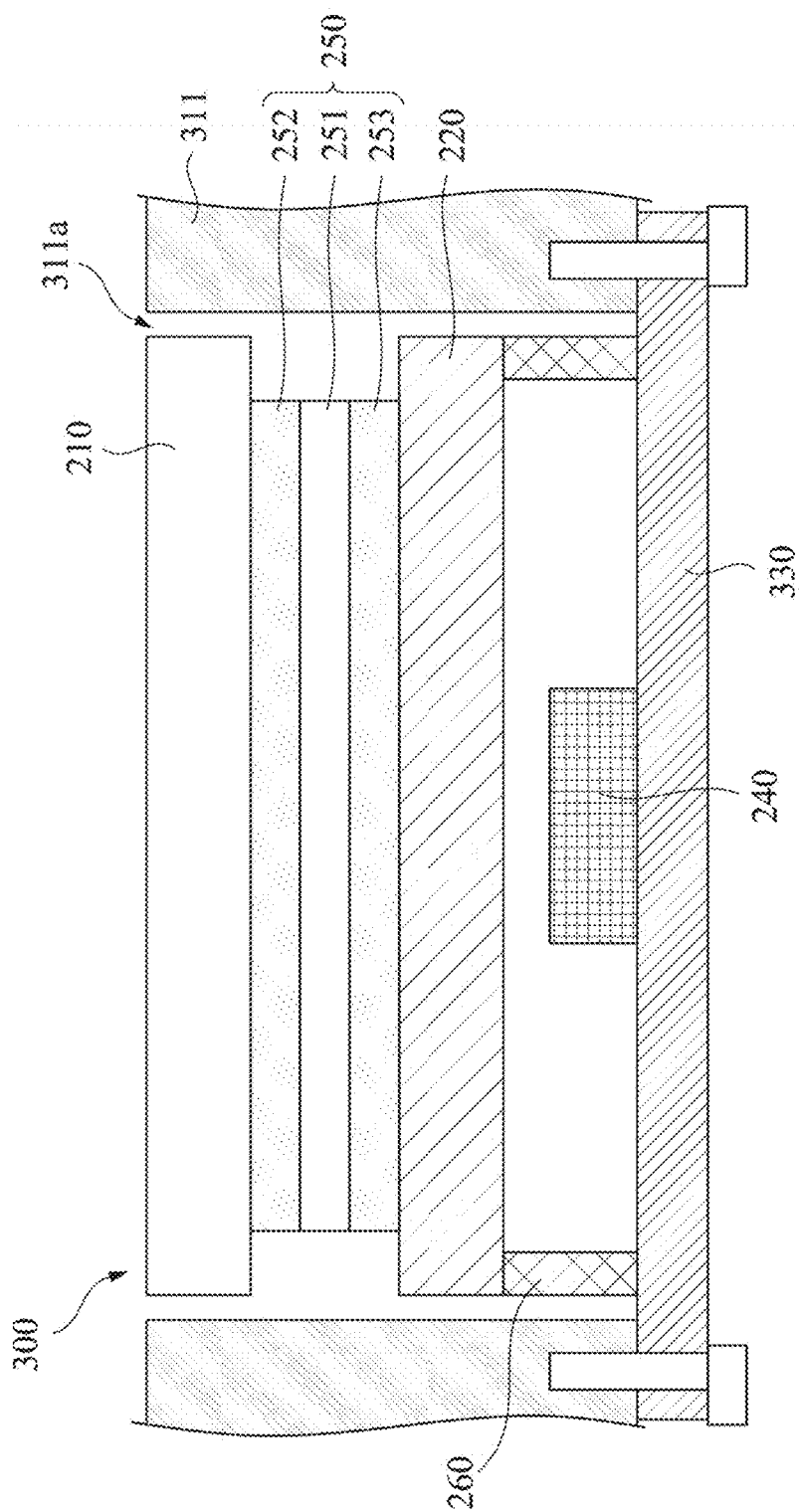
FIG. 3 is a cross-sectional schematic diagram showing the touchpad assembly of another embodiment of the present disclosure.

Please refer to FIG. 3. FIG. 3 is a cross-sectional schematic diagram of the touchpad assembly 300 of another embodiment of the present disclosure. In comparison with the embodiment shown in FIG. 2, the embodiment provides a casing part 311 and a carrying mechanism 330 with some modifications. Specifically, the touchpad assembly 300 is disposed in the opening 311a of the casing part 311 and mounted to the inner surface of the casing part 311 (for example, through a screw). The touchpad assembly 300 is mounted to the inner surface of the casing part 311 through the carrying mechanism 330. The magnet group 240 and the vibration isolators 260 are directly disposed on the upper surface of the carrying mechanism 330. Furthermore, in comparison with the carrying mechanism 230 illustrated in FIG. 2, the carrying mechanism 330 of the embodiment is a single-layered board.

Figure 4:
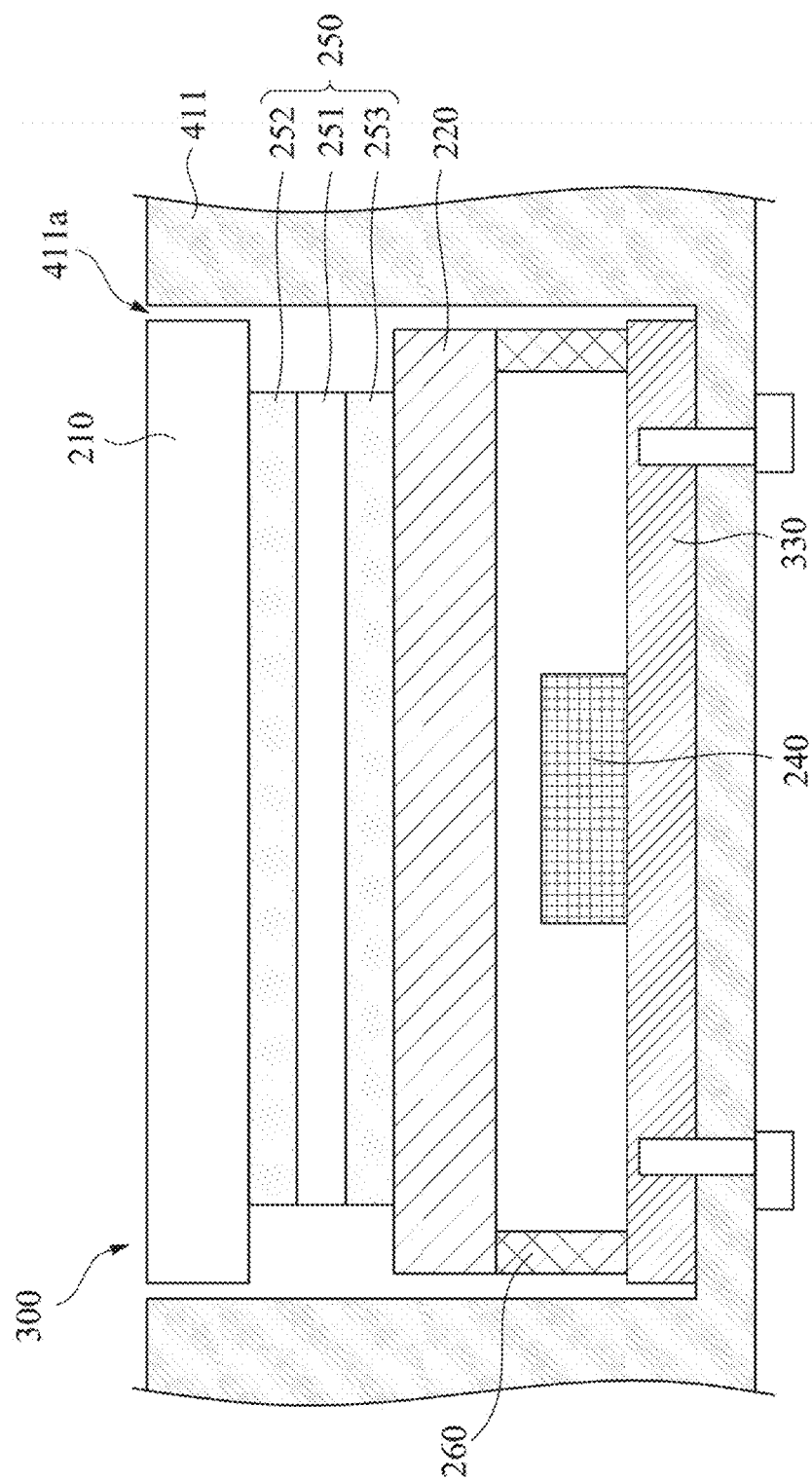
FIG. 4 is a cross-sectional schematic diagram showing the touchpad assembly of another embodiment of the present disclosure.

Please refer to FIG. 4. FIG. 4 is a cross-sectional schematic diagram of the touchpad assembly 300 of another embodiment of the present disclosure. In comparison with the embodiment shown in FIG. 3, the embodiment provides a casing part 411 with modifications. Specifically, the touchpad assembly 300 is disposed in the recessed groove 411a of the casing part 411 and mounted to the bottom surface of the recessed groove 411a (for example, through a screw), in which the recessed groove 41 la of the casing part 411 is located on the outer surface of the casing part 411.

Figure 5:
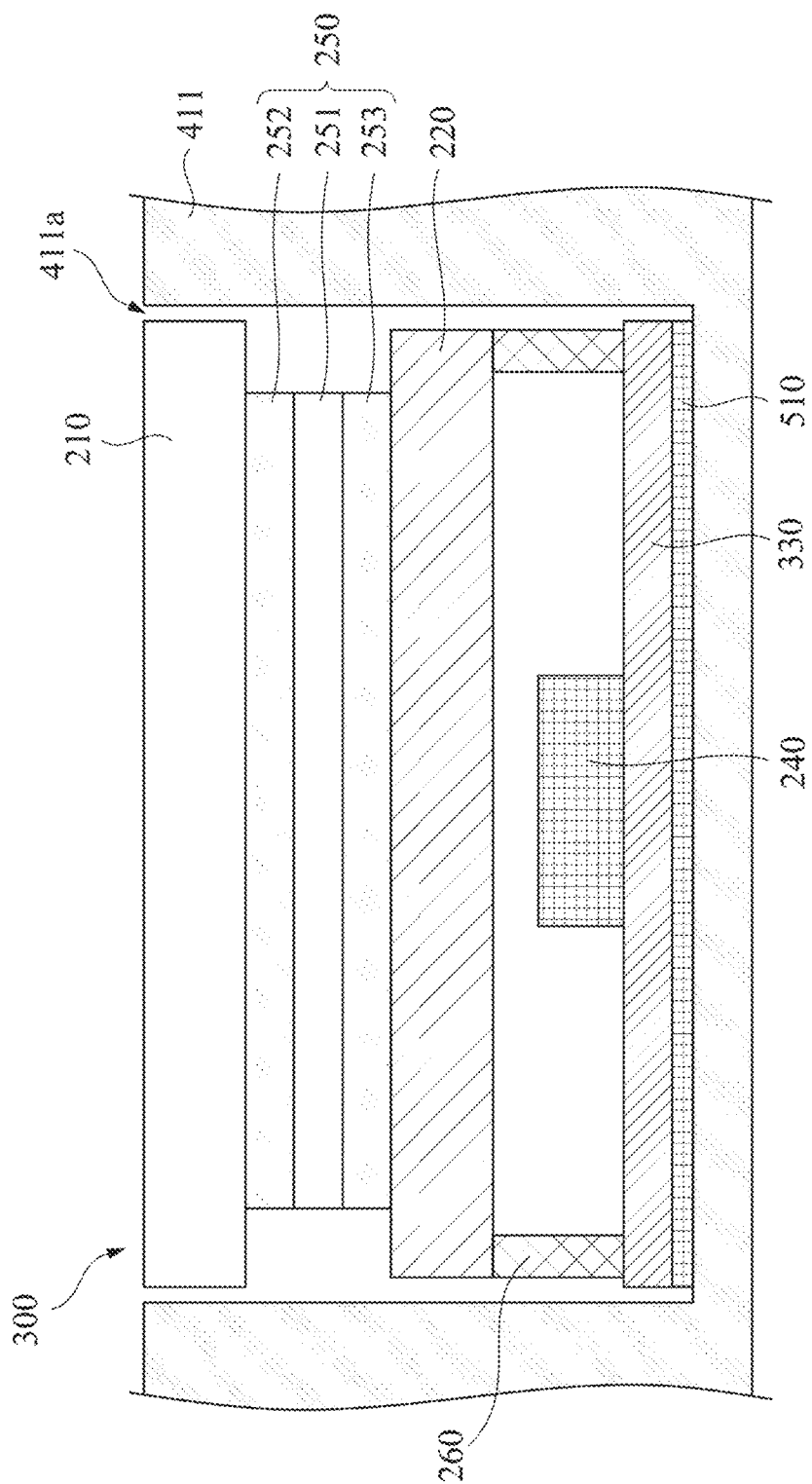
FIG. 5 is a cross-sectional schematic diagram showing the touchpad assembly of another embodiment of the present disclosure.

Please refer to FIG. 5. FIG. 5 is a cross-sectional schematic diagram of the touchpad assembly 300 of another embodiment of the present disclosure. In comparison with the embodiment shown in FIG. 4, the embodiment provides a mounting method between the touchpad assembly 300 and the casing part 411 with modifications. Specifically, the touchpad assembly 300 and the casing part 411 of the embodiment are mounted to each other through an adhesive component 510. In several embodiments, the adhesive component 510 is a pressure-sensitive adhesive layer (PSA layer). However, the present disclosure is not limited thereto.

In several embodiments, the material of the second carrying part 232 comprises silicon steel. The second carrying part 232, having an appearance of an ultra-thin silicon plate, not only can reduce the total thickness "Ta" of the touchpad assembly 200, but also has a good magnetic permeability, which can reduce the eddy current loss.

Figure 6A:
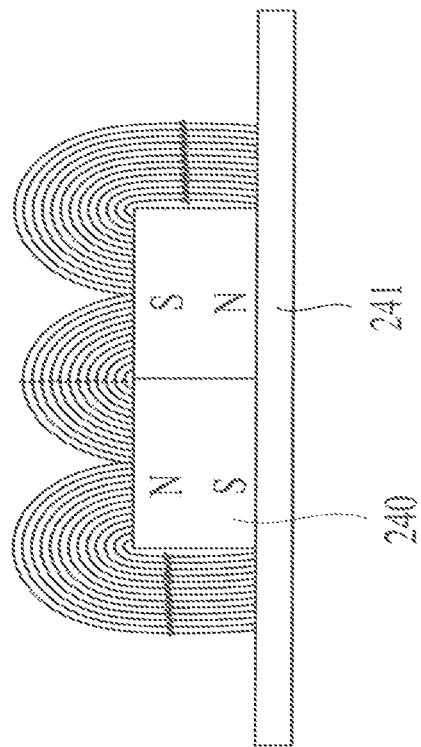
FIG. 6A is a schematic diagram showing the lines of magnetic fields of the magnet group of an embodiment of the present disclosure.
Figure 6B:
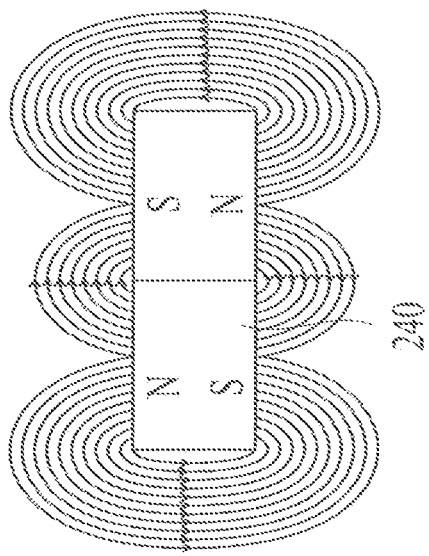
FIG. 6B is a schematic diagram showing the lines of magnetic fields of the magnet group disposed on a silicon steel plate of an embodiment of the present disclosure.

Please refer to FIG. 6A and FIG. 6B. FIG. 6A is a schematic diagram of the lines of magnetic fields of the magnet group 240 of an embodiment of the present disclosure. FIG. 6B is a schematic diagram of the lines of magnetic fields of the magnet group 240 disposed on a silicon steel plate 241 of an embodiment of the present disclosure. According to the lines of magnetic fields of FIG. 6A and FIG. 6B, the silicon steel plate 241 has a magnetic permeability effect that can constrain the magnetic field from divergence, so that the magnetic fields are more concentrated. As a result, the lines of magnetic fields in the same range are more concentrated with a silicon steel plate 241.

Figure 7:
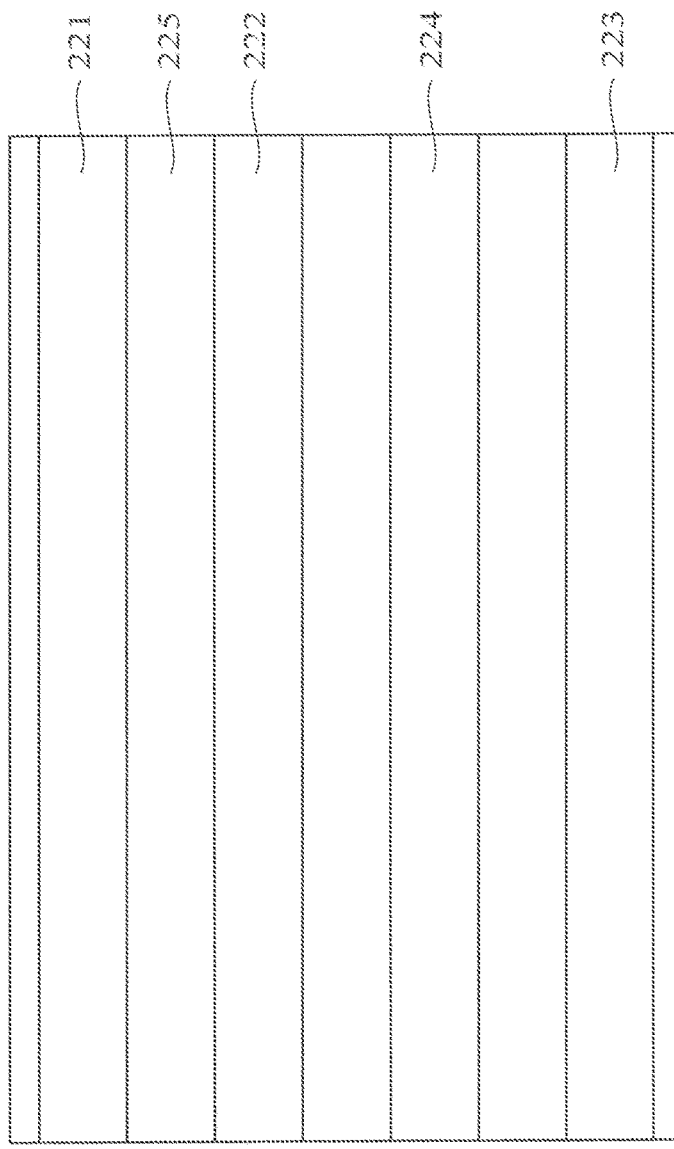
FIG. 7 is a cross-sectional schematic diagram showing the touch circuit board of FIG. 2.

Please refer to FIG. 7. FIG. 7 is a cross-sectional schematic diagram of the touch circuit board 220 of FIG. 2. In the embodiment, as illustrated in FIG. 2 and FIG. 7, the touch circuit board 220 comprises a first touch electrode layer 221, a second touch electrode layer 222, and a single-layer embedded coil layer 223 away from the cover plate 210. The magnet group 240, disposed on the carrying mechanism 230, and the single-layer embedded coil layer 223, disposed on the touch circuit board 220, constitute a vibration module. The touch circuit board 220 and the magnet group 240 form a pressing gap G therebetween. One thing to be noted is that the conductive portion used in the vibration module only comprises the single-layer embedded coil layer 223, which can effectively reduce the total thickness Ta of the touchpad assembly 200.

Figure 8:
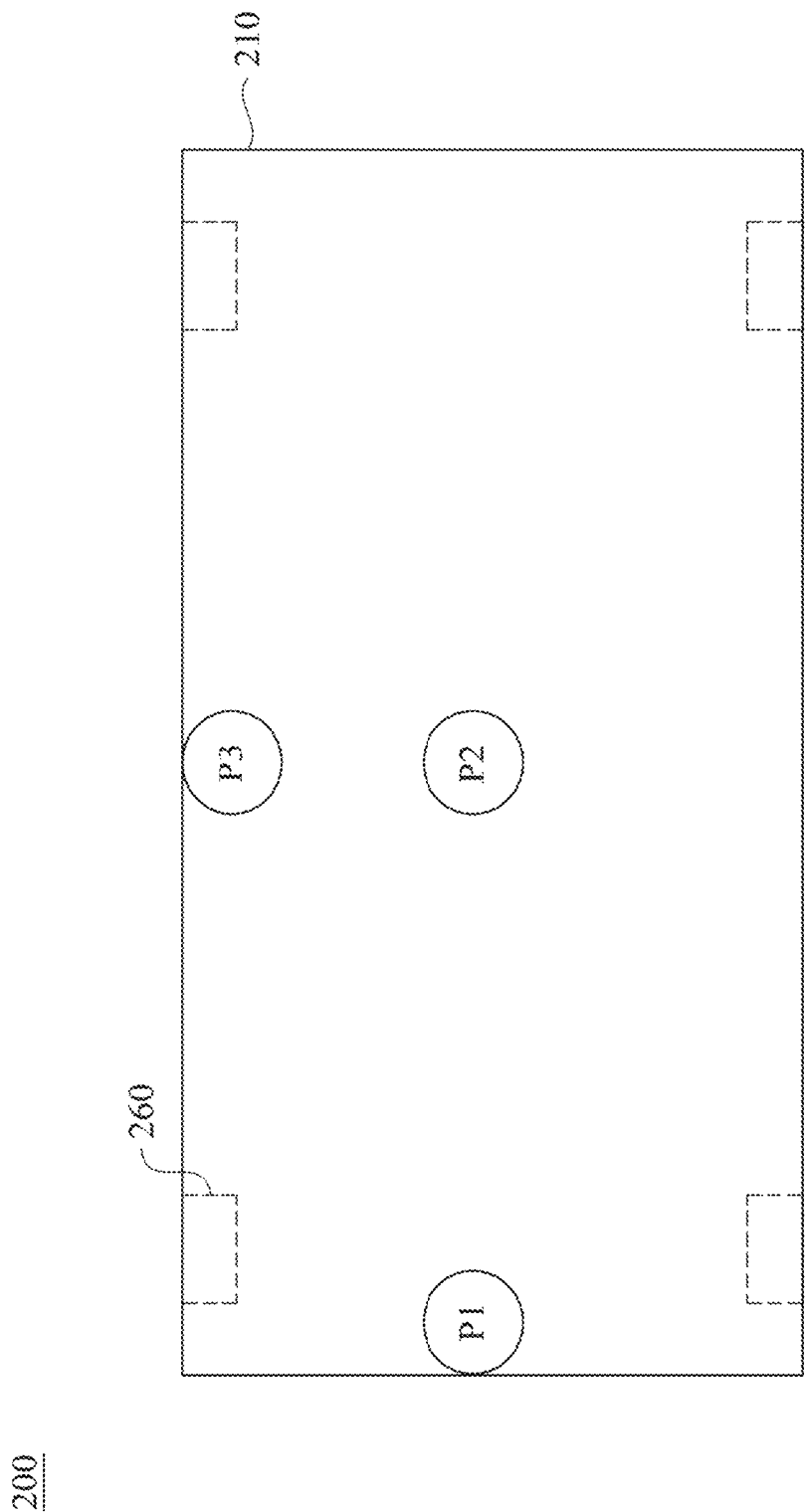
FIG. 8 is a schematic diagram showing a top-view picture of the touchpad assembly of an embodiment of the present disclosure.

Please refer to FIG. 8. FIG. 8 is a schematic diagram showing a top-view picture of the touchpad assembly 200 of an embodiment of the present disclosure. In the embodiment as illustrated in FIG. 8, the quantity of the vibration isolators 260 included in the touchpad assembly 200 is 4. The vibration isolators 260 are separately located near four corners of the touchpad assembly 200. Two of these four vibration isolators 260 are aligned with the upper long edge of the touchpad assembly 200; the other two vibration isolators 260 are aligned with the lower long edge of the touchpad assembly 200. However, the number of vibration isolators 260 included in the touchpad assembly 200 is not limited to this.

Figure 9:
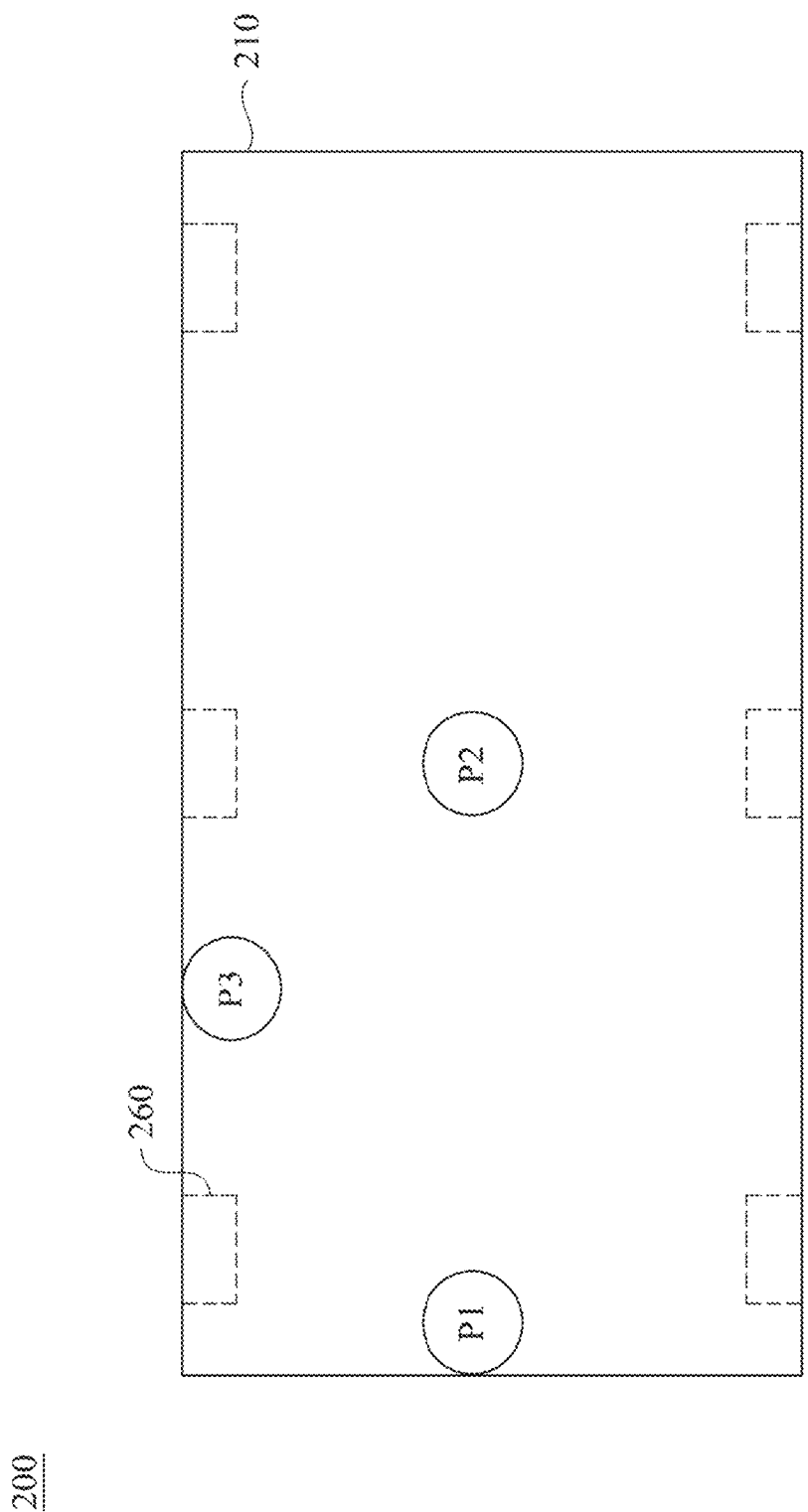
FIG. 9 is a schematic diagram showing a top-view picture of the touchpad assembly of another embodiment of the present disclosure.

Please refer to FIG. 9. FIG. 9 is a schematic diagram showing a top-view picture of the touchpad assembly of another embodiment of the present disclosure. In the embodiment as illustrated in FIG. 9, the quantity of the vibration isolators 260 included in the touchpad assembly 200 is 6. In comparison with the embodiment illustrated in FIG. 8, the two additional vibration isolators 260 of the embodiment in FIG. 9 are aligned with the upper long edge and the lower long edge of the touchpad assembly 200 respectively, located at the centers of the upper long edge and the lower long edge thereof respectively.

In several embodiments, the thickness of the vibration isolator 260 is from 0.55 mm to 0.95 mm.

In several embodiments, a maximum press-down deformation is from 0.3 mm to 0.7 mm, when the central area of the cover plate 210 is pressed. The vibration module is configured to generate a vibration acceleration from 2G to 15G. Through an appropriate design that copes with the maximum press-down deformation range and the vibration acceleration range, an excellent balance can be achieved between thinning the touchpad assembly and meeting the required measurement of vibration detection. One thing to be noted is that, if the vibration acceleration is smaller than 2G, the user is unable to feel the vibration effect. If the vibration acceleration is larger than 15G, the size of the magnet group 240 needs to be increased, which is not favorable to thinning the touchpad assembly 200. In practical commercial applications, the acceptable range of the vibratory sensation is from 2G to 15G for vibration modules, and from 3.5G to 15G for laptops of most brands in the market. Furthermore, the acceptable range of the vibration acceleration is from 8G to 15G for commercial vibration modules of some high-end laptop models in order to meet satisfaction of users.

Figure 14A:
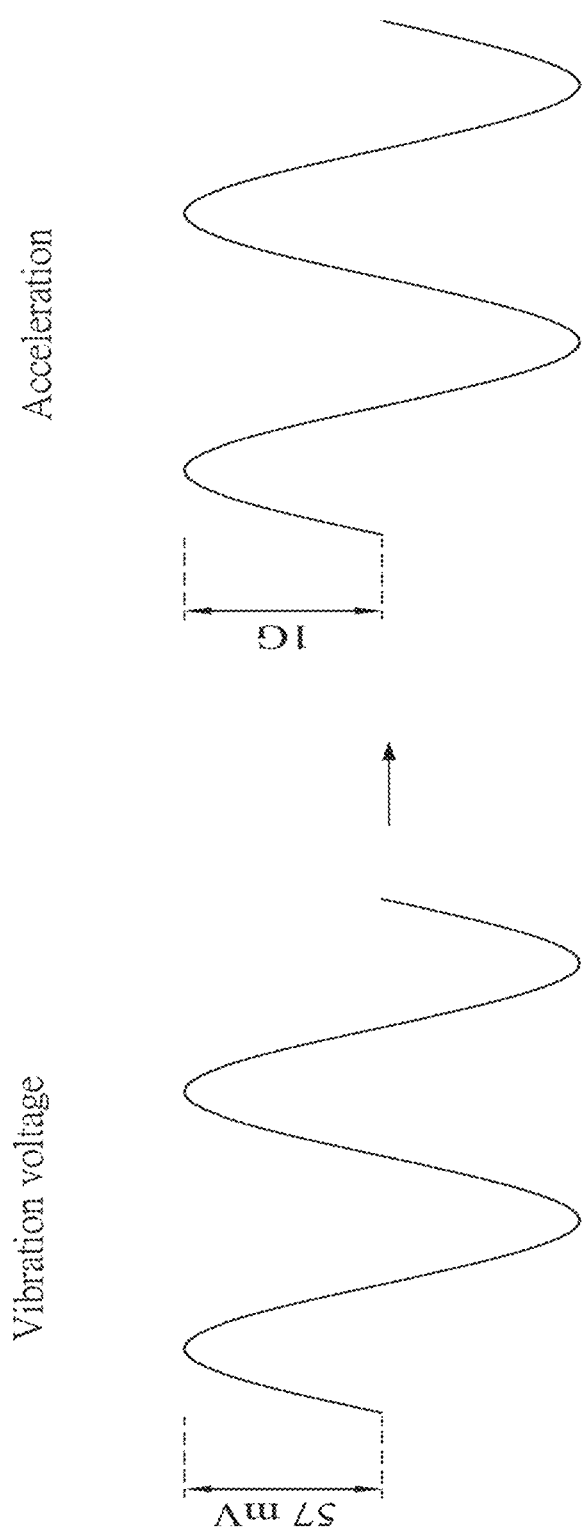
FIG. 14A discloses the converted calculation between the vibration voltage and the acceleration value "G" of Model No. DRV-ACC16-EVM.
Figure 14B:
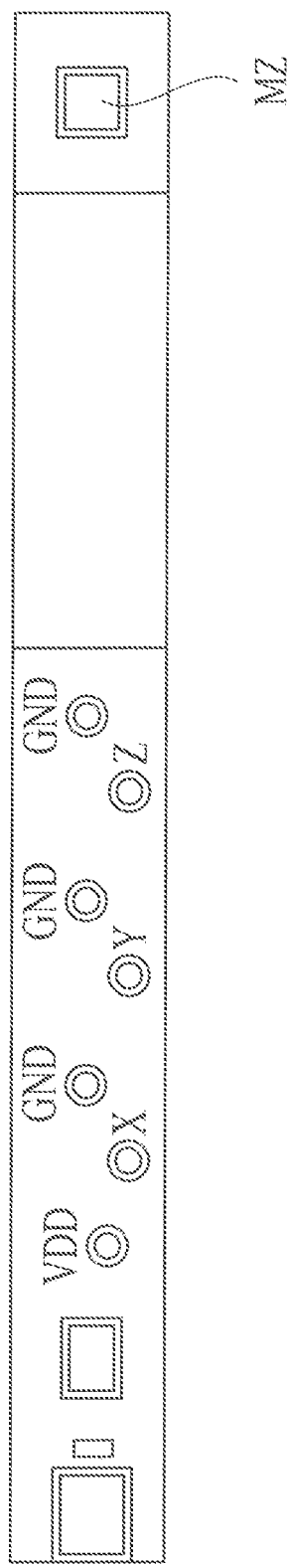
FIG. 14B discloses the design showing the triaxial measurement platform of Texas Instrument, in which the vibration sensing element is disposed in the measurement zone (MZ) to the far right side to be measured.
Figure 14C:
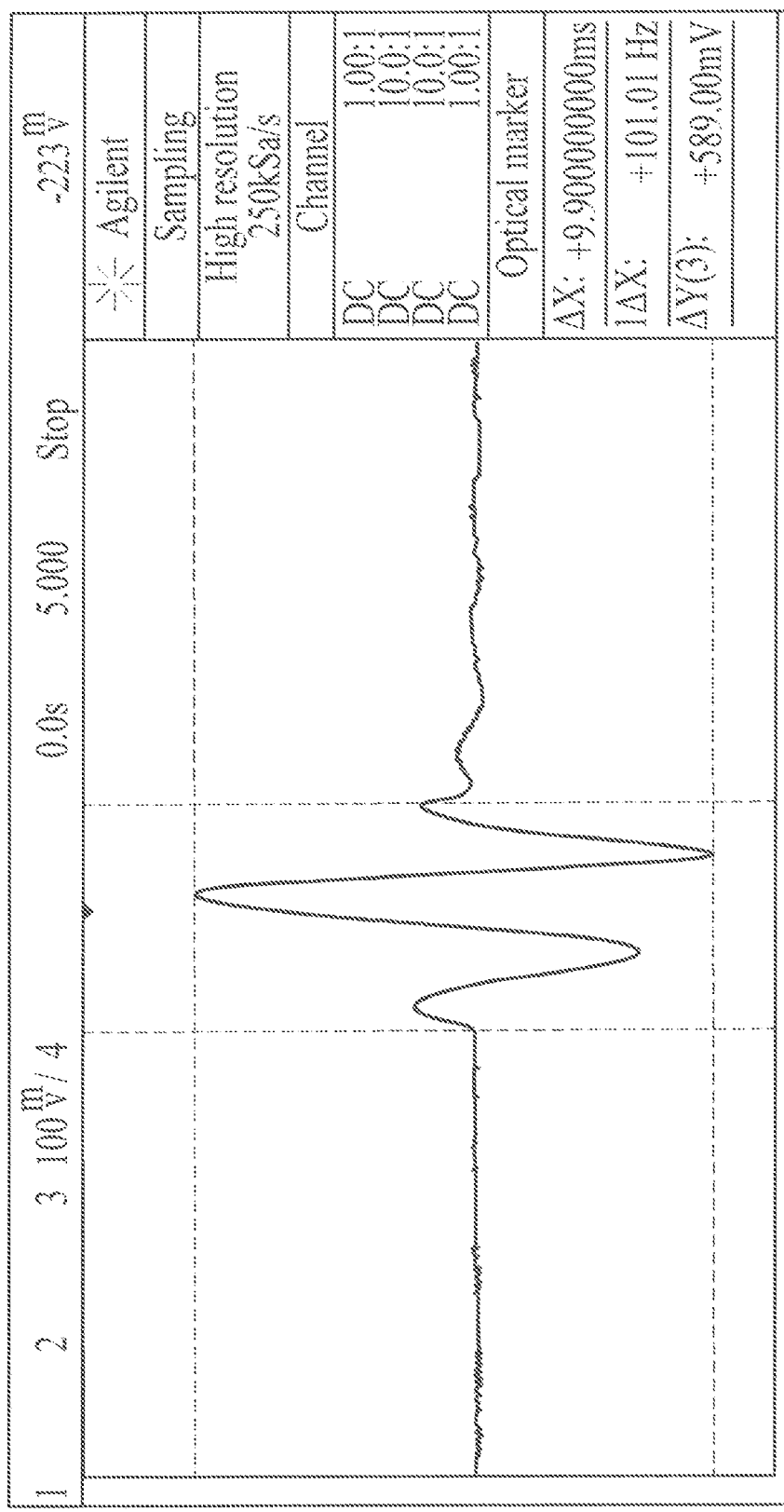
FIG. 14C discloses the actual measurement and calculations based on the theory of computation and the User's Manual described in FIG. 14A.

With respect to the calculation of the vibration acceleration, the present disclosure uses an accelerometer of Texas Instrument Model No. DRV-ACC16-EVM and a User's Manual of the Texas Instrument Model No. DRV-ACC16-EVM to measure the vibration acceleration. FIG. 14A discloses the converted calculation between the vibration voltage and the acceleration value "G", in which the "G" is equal to 9.81 m/s², namely the Gravitational Acceleration. If the test value of acceleration is 8G, the converted calculation of 8G is 8×9.81 m/s². FIG. 14B discloses the design showing the triaxial measurement platform of Texas Instrument, in which the vibration sensing element is disposed in the measurement zone (MZ) to the far right side to be measured. FIG. 14C discloses the actual measurement and calculations based on the theory of computation and the User's Manual described in FIG. 14A. The V (Peak-Peak) voltage value is measured by a triaxial accelerometer; the difference of the crest and trough is listed on the right lower corner (ΔY=589 mV) of FIG. 14C. Therefore, G(Peak-Peak)=V(Peak-Peak)/57=589/57=10.33G is derived based on the equation. The aforementioned method is used for conducting a unit conversion of the G value, measurement verification, and proofs.

The applicant of the patent application provides the following simulation tests of pressing actions (1), (2), and (3) as proofs of reasonableness of aforementioned accommodating designs. In the simulation test of pressing actions (1), the common dimensional parameters (length(L)×width (W)×height(H)) are: 60×40×0.8 mm (L×W×H) of the magnet group 240, 7×4×0.5 mm (L×W×H) of the vibration isolator 260, and 75×45×0.3 mm (L×W×H) of the second carrying part 232. The pressing gap G between the touch circuit board 220 and the magnet group 240 is 0.2 mm. In the simulation test of pressing actions (1), the common material parameters are: the cover plate 210 with a Young's modulus of 80000 MPa, the cover plate 210 with a Poisson's ratio of 0.22, the touch circuit board 220 with a Young's modulus of 30000 MPa, the touch circuit board 220 with a Poisson's ratio of 0.33, the plastic layer 251 with a Young's modulus of 1950 MPa, the plastic layer 251 with a Poisson's ratio of 0.4, PSA layers 252, 253 with a Young's modulus of 100 MPa, PSA layers 252, 253 with a Poisson's ratio of 0.4, the carrying mechanism 230 with a Young's modulus of 200000 MPa, the carrying mechanism 230 with a Poisson's ratio of 0.3, the vibration isolator 260 with a Young's modulus of 0.6703 MPa, and the vibration isolator 260 with a Poisson's ratio of 0.4.

After simulation tests of pressing actions conducted at the pressing points P1, P2, and P3 on the cover plate 210, illustrated in FIG. 8 and FIG. 9, are separately completed, the simulation data of the simulation tests of pressing actions (1) are listed in Table 1. The pressing point P1 corresponds to the midpoint of the short edge of the cover plate 210 illustrated in FIG. 8 and FIG. 9 separately; the pressing point P2 corresponds to the center region of the cover plate 210 illustrated in FIG. 8 and FIG. 9 separately; the pressing point P3 corresponds to the midpoint between two adjacent vibration isolators 260 located along the long edge of the cover plate 210.

TABLE 1

Simulation tests of pressing actions (1)

| (Length × Width) of Cover Plate (mm) | Type | Pressing Point 1 Pressing Force (gf) | Pressing Point 1 Pressing Force (gf) | Pressing Point 3 Pressing Force (gf) |
|---|---|---|---|---|
| 120 × 80 | A | 156.9(m) | 125.0(m) | 80.0(m) |
|  | B | 156.9(m) | 192.5(m) | 232.8(m) |
| 150 × 90 | A | 283.4(m) | 74.1(m) | 72.5(m) |
|  | B | 283.4(m) | 163.0(m) | 202.4(m) |

One thing to be noted is that the Type A in Table 1 corresponds to the touchpad assembly 200 that comprises four vibration isolators 260, as illustrated in FIG. 8, while Type B corresponds to the touchpad assembly 200 that comprises six vibration isolators 260, as illustrated in FIG. 9. The pressing force in Table 1 represents the force that is applied to the touch circuit board 220 until the touch circuit board 220 is in contact with the carrying mechanism 230 or the magnet group 240 (that is, boundaries of the non-contact load capacity). The symbol (m) in Table 1 indicates that the touch circuit board 220 is in contact with the magnet group 240 first. According to data in Table 1, the non-contact load capacity of the pressing point P3 of Type A is smaller than 110 gf (gram-force) which does not meet the load capacity requirement of commercial applications.

In comparison with the aforementioned common dimensional parameters used in the simulation tests of pressing actions (1), simulation tests of pressing actions (2) use vibration isolators 260 with 0.6 mm in height instead, and the pressing gap G between the touch circuit board 220 and the magnet group 240 is 0.3 mm instead. After the simulation tests of pressing actions conducted at the pressing points P1, P2, and P3 on the cover plate 210 (as illustrated in FIG. 8 and FIG. 9) have been separately completed, the simulation data of the simulation tests of pressing actions (2) are listed in Table 2.

TABLE 2

Simulation tests of pressing actions (2)

| (Length × Width) of Cover Plate (mm) | Type | Pressing Point 1 Pressing Force (gf) | Pressing Point 2 Pressing Force (gf) | Pressing Point 3 Pressing Force (gf) |
|---|---|---|---|---|
| 120 × 80 | A | 472(m) | 188(m) | 176(m) |
|  | B | 435(s) | 313(m) | >1000 |
| 150 × 90 | A | 426(s) | 138(m) | 157(m) |
|  | B | 431(s) | 318(m) | 828(m) |

The symbol(s) in Table 2 indicates that the touch circuit board 220 is in contact with the carrying mechanism 230 first. According to the data in Table 2, the non-contact load capacities of the pressing points P1, P2, and P3 of Type A and B are all larger than 110gf, which meet the load capacity requirement of commercial applications.

In comparison with the aforementioned common dimensional parameters used in the simulation tests of pressing actions (1), the simulation tests of pressing actions (3) use vibration isolators 260 with 0.7 mm in height instead; the pressing gap G between the touch circuit board 220 and the magnet group 240 is 0.4 mm instead. After the simulation tests of pressing actions conducted at the pressing points P1, P2, and P3 on the cover plate 210 (as illustrated in FIG. 8 and FIG. 9) are separately completed, the simulation data of the simulation tests of pressing actions (3) are listed in Table 3.

TABLE 3

Simulation tests of pressing actions (3)

| (Length × Width) of Cover Plate (mm) | Type | Pressing Point 1 Pressing Force (gf) | Pressing Point 2 Pressing Force (gf) | Pressing Point 3 Pressing Force (gf) |
|---|---|---|---|---|
| 120 × 80 | A | 527(s) | 276(m) | 248(m) |
|  | B | 534(s) | 468(m) | >1000 |
| 150 × 90 | A | 518(s) | 193(m) | 180(m) |
|  | B | 522(s) | 467(m) | >1000 |

According to the data in Table 3, the non-contact load capacities of the pressing points P1, P2, and P3 of Type A and B are all larger than 110gf, which meet the load capacity requirement of commercial applications.

Based on the simulation data of the simulation tests of pressing actions (1), (2), and (3), it is concluded that, when the central area of the cover plate 210 is pressed, the maximum press-down deformation ranging from 0.3 mm to 0.7 mm is a reasonable range. When the pressing gap G between the touch circuit board 220 and the magnet group 240 is larger than 0.3 mm, the load capacities will meet the requirement of commercial applications. Furthermore, when the maximum press-down deformation exceeds 0.7 mm, it does not generate significant benefits. On the contrary, it will lead to an increase of the total thickness "Ta" of the touchpad assembly 200.

The applicant provides the following measurement data of vibration acceleration measured under different driving voltages and coil resistance, and with silicon steel plates of different thickness. In the Table below, for various combinations of the driving voltage (3.5-10.5 volt) and coil resistance (5-7 ohm) in different scenarios, it shows that when the thickness of the silicon steel plate gradually increases by 0.2 mm to approximate 0.5 mm, the vibration acceleration increases and approximates the limit value. With the verification, the use of a silicon steel plate, having an upper critical thickness (that is, less than or equal to 0.5 mm), not only can thinning the touchpad assembly be managed but also an excellent effect of vibration acceleration is achieved (that is, configured with a vibration module to generate excellent effect of vibration acceleration). In other words, it is proven that the method is to effectively increase the limit value of the vibration acceleration, and there is no need to over-increase the thickness (for example, a thickness larger than 0.5 mm).

| Driving Voltage (V) | Coil Resistance (ohm) | Vibration Acceleration (G) | | | |
|---|---|---|---|---|---|
| | | Thickness of Silicon Steel Plate | | | |
| | | None | 0.2 mm | 0.35 mm | 0.5 mm |
| 3.5 | 7.0 | 2.502 | 2.867 | 3.239 | 3.384 |
| 5.0 | 7.0 | 2.919 | 3.344 | 3.778 | 3.949 |
| 6.5 | 7.0 | 4.170 | 4.778 | 5.398 | 5.641 |
| 7.0 | 7.0 | 5.421 | 6.211 | 7.017 | 7.333 |
| 8.5 | 7.0 | 5.838 | 6.689 | 7.557 | 7.897 |

-continued

| Driving Voltage (V) | Coil Resistance (ohm) | Vibration Acceleration (G) | | | |
|---|---|---|---|---|---|
| | | Thickness of Silicon Steel Plate | | | |
| | | None | 0.2 mm | 0.35 mm | 0.5 mm |
| 10.5 | 7.0 | 7.089 | 8.122 | 9.176 | 9.589 |
| 3.5 | 6.0 | 2.919 | 3.344 | 3.778 | 3.949 |
| 5.0 | 6.0 | 4.170 | 4.778 | 5.398 | 5.641 |
| 6.5 | 6.0 | 5.421 | 6.211 | 7.017 | 7.333 |
| 7.0 | 6.0 | 5.838 | 6.689 | 7.557 | 7.897 |
| 8.5 | 6.0 | 7.089 | 8.122 | 9.176 | 9.589 |
| 10.5 | 6.0 | 8.757 | 10.033 | 11.335 | 11.846 |
| 3.5 | 5.0 | 3.503 | 4.012 | 4.534 | 4.738 |
| 5.0 | 5.0 | 5.004 | 5.733 | 6.477 | 6.769 |
| 6.5 | 5.0 | 6.505 | 7.453 | 8.420 | 8.800 |
| 7.0 | 5.0 | 7.006 | 8.027 | 9.068 | 9.476 |
| 8.5 | 5.0 | 8.507 | 9.746 | 11.011 | 11.507 |
| 10.5 | 5.0 | 10.508 | 12.040 | 13.602 | 14.215 |

Figure 10:
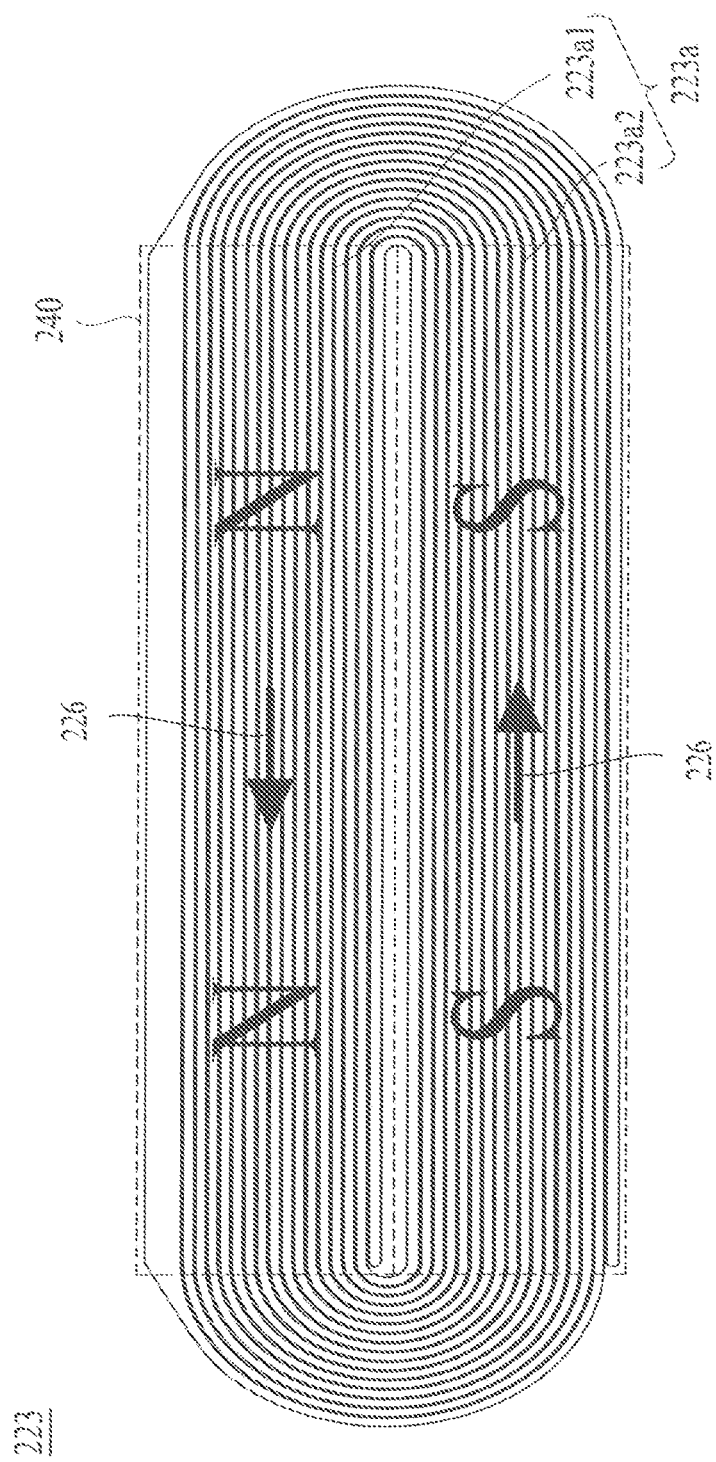
FIG. 10 is a schematic diagram showing a top-view picture of the single-layer embedded coil layer as well as the magnet group of an embodiment of the present disclosure.

Please refer to FIG. 10. FIG. 10 is a schematic diagram of a top-view of the single-layer embedded coil layer 223 and the magnet group 240 of an embodiment of the present disclosure. In the embodiment as illustrated in FIG. 10, the single-layer embedded coil layer 223 comprises a single coil unit 223a. The coil unit 223a comprises two straight sections 223a1 and 223a2. The straight sections 223a1 and 223a2 are aligned horizontally and stacked vertically side by side. The polarity of the magnet group 240 located under the straight section 223a1 is an N pole; the polarity of the magnet group 240 located under the straight section 223a2 is an S pole. For example, when the direction of an electric current of the coil unit 223a (the direction of the thick arrow 226 illustrated in FIG. 10) is counterclockwise, both the force directions on the straight sections 223a1 and 223a2 are upward based on the left-hand rule (that is, the palm pointing in the direction of the N pole; four fingers pointing in pointing in direction of the N pole direction of the electric current; then the thumb pointing in direction of the N pole direction of force on the conductor). Relatively, when the direction of an electric current of the coil unit 223a is clockwise, both the force directions on the straight sections 223a1 and 223a2 are downward.

In several embodiments, the number of metal layers included in the touch circuit board 220 is not larger than 5. For example, in the embodiment illustrated in FIG. 7, the touch circuit board 220 further comprises a shielding layer 224. The first touch electrode layer 221, the second touch electrode layer 222, the shielding layer 224, and the single-layer embedded coil layer 223 are stacked vertically in the order given and are electrically isolated by the insulting layer 225. The single-layer embedded coil layer 223 can be electrically connected with the shielding layer 224 via the through-hole 231a.

Figure 11:
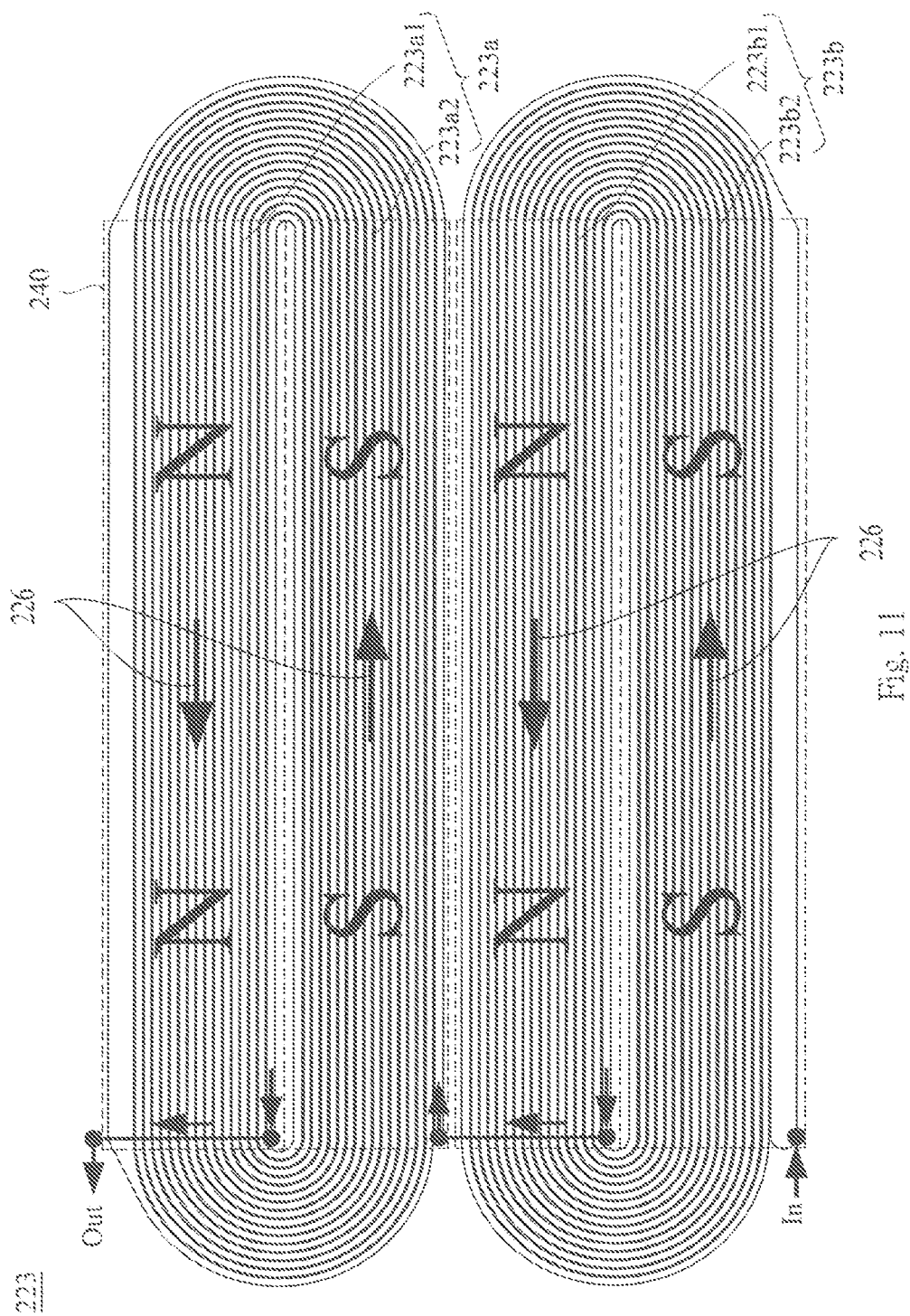
FIG. 11 is a schematic diagram showing a top-view picture of the single-layer embedded coil layer as well as the magnet group of another embodiment of the present disclosure.

Please refer to FIG. 11. FIG. 11 is a schematic diagram showing a top-view picture of the single-layer embedded coil layer 223 and the magnet group 240 of another embodiment of the present disclosure. In the embodiment illustrated in FIG. 11, the single-layer embedded coil layer 223 comprises two coil units 223a and 223b. These two coil units 223a and 223b are electrically connected through the shielding layer 224. Specifically, the coil winding method of coil units 223a and 223b are identical and are connected in series through the shielding layer 224. The coil unit 223a comprises two straight sections 223a1 and 223a2. The two straight sections 223a1 and 223a2 are aligned horizontally and stacked vertically side by side. The coil unit 223b comprises two straight sections 223b1 and 223b2. The two straight sections 223b1 and 223b2 are aligned horizontally and stacked vertically side by side. The polarity of the magnet group 240 located under the straight sections 223a1 and 223b1 is an N pole. The polarity of the magnet group 240 located under the straight sections 223a2 and 223b2 is an S pole. For example, when the directions of an electric current of the coil unit 223a and 223b (the direction of the thick arrow 226 illustrated in FIG. 11) is counterclockwise, all the force directions on the straight sections 223a1, 223a2, 223b1, and 223b2 are upward based on the left-hand rule. Relatively, when the direction of an electric current of the coil units 223a and 223b is clockwise, all the force directions on the straight sections 223a1, 223a2, 223b1, and 223b2 are downward.

Figure 12:
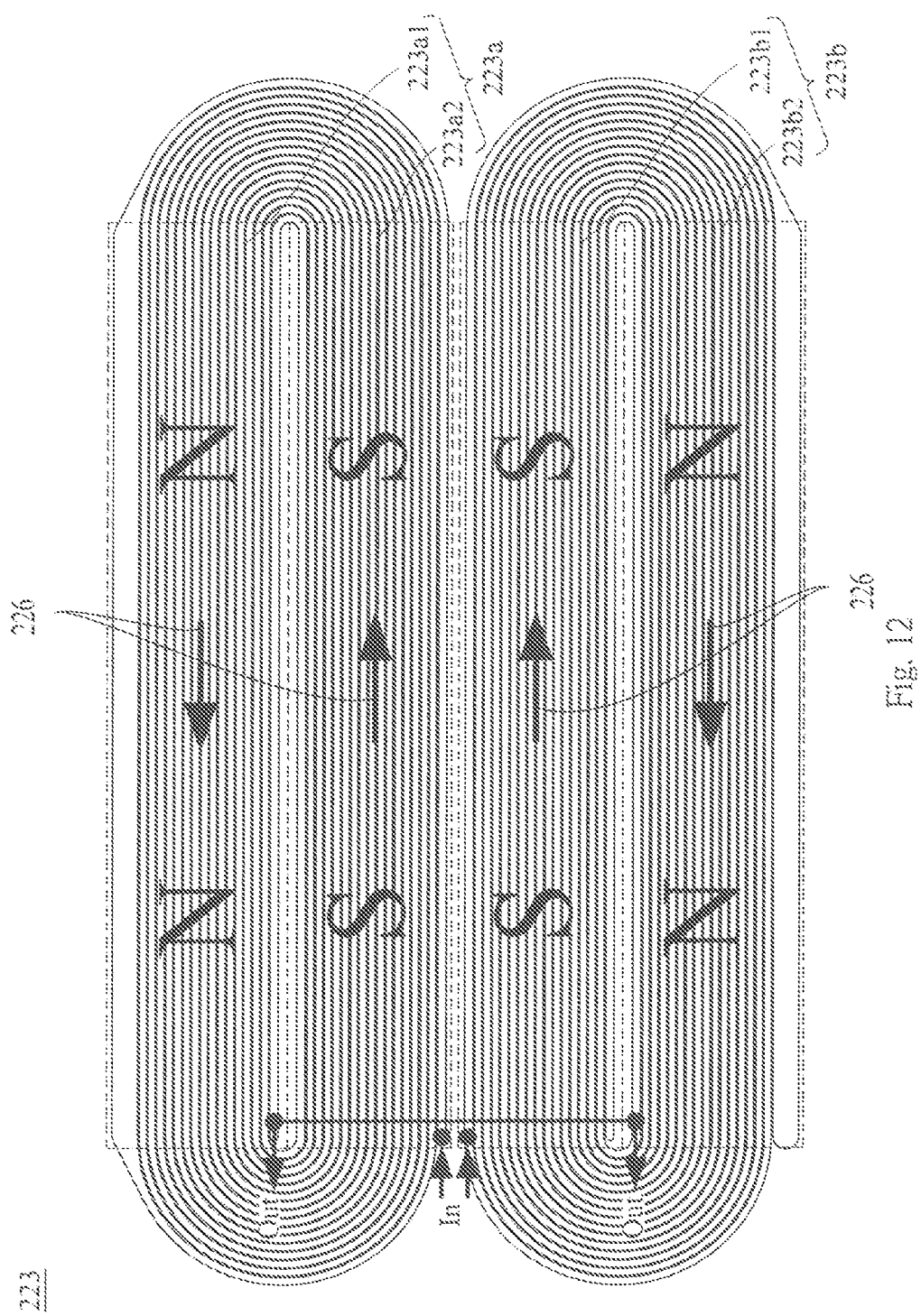
FIG. 12 is a schematic diagram showing a top-view picture of the single-layer embedded coil layer as well as the magnet group of another embodiment of the present disclosure.

Please refer to FIG. 12. FIG. 12 is a schematic diagram showing a top-view picture of the single-layer embedded coil layer and the magnet group of another embodiment of the present disclosure. In the embodiment illustrated in FIG. 12, the single-layer embedded coil layer 223 comprises two coil units 223a and 223b. These two coil units 223a and 223b are electrically connected through the shielding layer 224. Specifically, the coil winding method of coil units 223a and 223b are identical and are connected in parallel through the shielding layer 224. The coil unit 223a comprises two straight sections 223a1 and 223a2. The two straight sections 223a1 and 223a2 are aligned horizontally and stacked vertically side by side. The coil unit 223b comprises two straight sections 223b1 and 223b2. The two straight sections 223b1 and 223b2 are aligned horizontally and stacked vertically side by side. The polarity of the magnet group 240 located under the straight sections 223a1 and 223b2 is an N pole. The polarity of the magnet group 240 located under the straight sections 223a2 and 223b1 is an S pole. For example, when the direction of an electric current of the coil unit 223a is counterclockwise and the direction of an electric current of the coil unit 223b is clockwise (the direction of the thick arrow 226 illustrated in FIG. 12), all the force directions on the straight sections 223a1, 223a2, 223b1, and 223b2 are upward based on the left-hand rule. Relatively, when the direction of an electric current of the coil unit 223a is clockwise and the direction of an electric current of the coil unit 223b is counterclockwise, all the force directions on the straight sections 223a1, 223a2, 223b1, and 223b2 are downward.

In several embodiments, the Young's modulus of the vibration isolator 260 ranges from 0.55 MPa to 0.8 MPa. Vibration isolators 260 with a Young's modulus in the aforementioned range can effectively reduce vibration noise and effectively release the vibration stress in the horizontal direction.

In several embodiments, the coil resistance of the single-layer embedded coil layer 223 ranges from 4 to 21 ohms. Theoretically, the coil resistance is smaller the better. Based on the same number of coil turns and the size of the magnet group 240, if the coil resistance is smaller, the driving current becomes larger; the force on the single-layer embedded coil layer 223 and the vibration acceleration thereof also become larger. However, due to the constraint of the driver chip, the coil resistance cannot be smaller than 4 ohms.

In several embodiments, the peak frequency of the vibration acceleration is between 170 Hz and 200 Hz, preferably 180 Hz, in order to provide users with comfortable vibratory sensation.

For example, Table 4 (below) contains physical properties of different materials released by Taica company.

| | Model Code | | | | | | |
|---|---|---|---|---|---|---|---|
| | α Gel | B Gel | θ-G | θ-E | θ-F | θ-E | NP Gel |
| Young's modulus (Mpa) | 0.03 | 0.15 | 0.03 | 0.12 | 0.67 | 1.43 | 0.27 |

According to Table 4, materials of Model Codes β gel, θ-F, and NP gel can be used for producing vibration isolators 260, due to the Young's modulus thereof ranging from 0.55 MPa to 0.8 MPa, which can effectively reduce vibration noise and effectively release the vibration stress in the horizontal direction. The material of the vibration isolator 260 can be silica gel.

Figure 13:
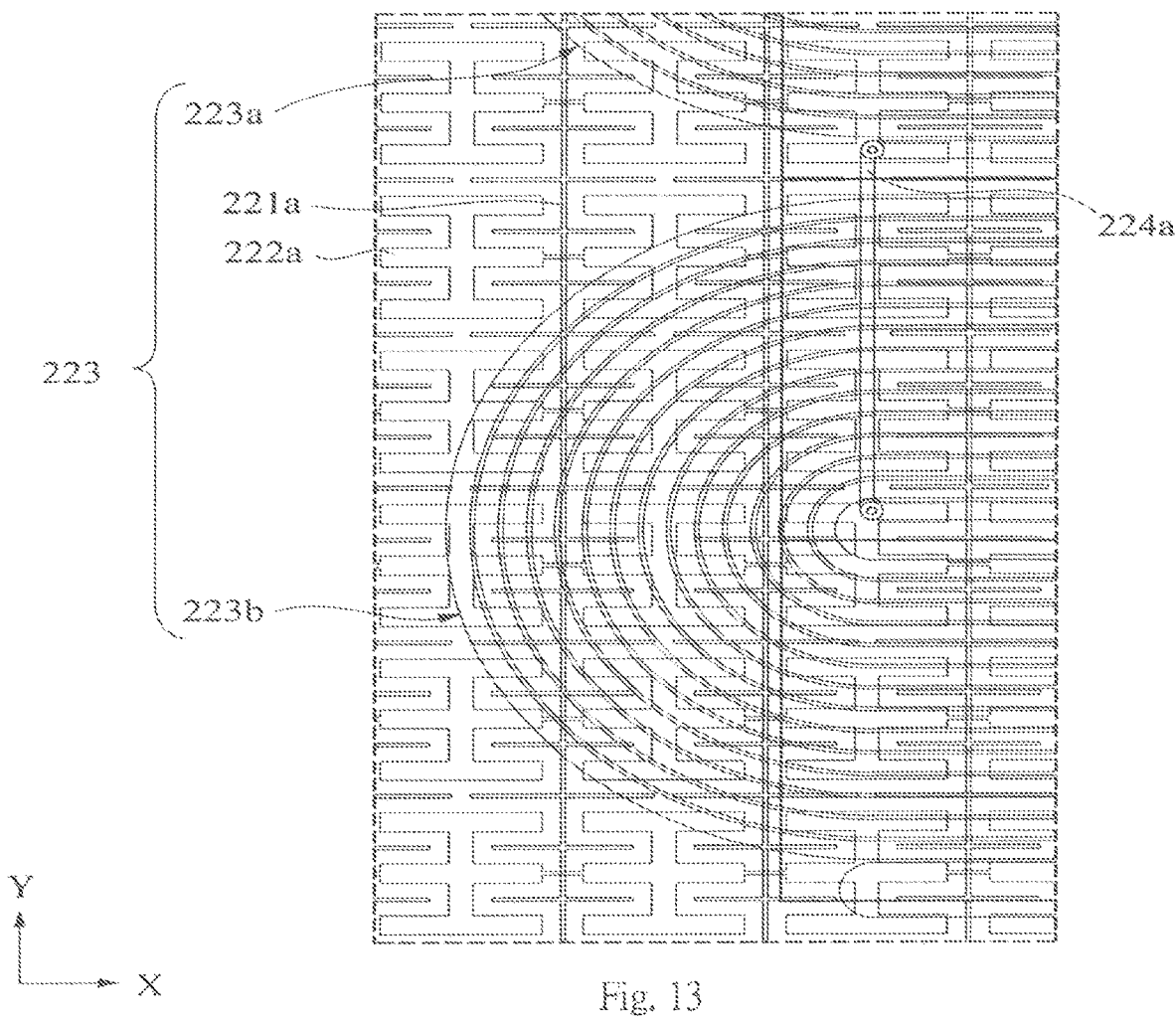
FIG. 13 is a schematic diagram showing a partial top-view picture of every circuit layer of the touch circuit board of an embodiment of the present disclosure.

Please refer to FIG. 13. FIG. 13 is a schematic diagram showing a partial top-view picture, which indicates every circuit layer of the touch circuit board 220 in an embodiment of the present disclosure. In the embodiment illustrated in FIG. 7 and FIG. 13, two coil units 223a and 223b of the single-layer embedded coil layer 223 are electrically connected through the jump wire 224a of the shielding layer 224. In addition, the first touch electrode layer 221 comprises a plurality of first touch units 221a. The first touch units 221a extend along the Y axis direction and are orderly arranged in the X axis direction. the second touch electrode layer 222 comprises a plurality of second touch units 222a. The second touch units 222a extend along the X axis direction and are orderly arranged in the Y axis. The jump wire 224a of the shielding layer 224a is routed on the second touch unit 222a of the second touch electrode layer 222 completely and does not overlap with the first touch unit 221a of the first touch electrode layer 221. Thus, the setting prevents the single-layer embedded coil layer 223 from interfering the touch signals to the maximum extent when any actions occur.

With the aforementioned descriptions of the embodiments of the present disclosure, it is obvious that, in the touchpad assembly of the present disclosure, the total thickness of the touchpad assembly can be effectively reduced owing to the fact that the single-layer embedded coil layer, disposed on the touch circuit board, and the magnet group, disposed on the carrying mechanism, can provide a method of dividing the pressing gap; and the single-layer embedded coil layer and the magnet group further constitute a vibration module. The total thickness of the touchpad assembly can further be reduced by having the magnet group disposed in the central accommodating portion of the carrying mechanism. Through an appropriate design that copes with the maximum press-down deformation range when the central area of the cover plate is pressed, and the vibration acceleration range generated by the vibration module, an excellent balance can be achieved between thinning the touchpad assembly and meeting the required measurement of vibration detection. In other words, the use of a silicon steel plate, having an upper critical thickness (that is, less than or equal to 0.5 mm) not only can manage thinning the touchpad assembly, but also achieve an excellent effect of vibration acceleration (that is, configured with a vibration module to generate excellent effect of vibration acceleration).

The aforementioned embodiments are chosen to describe the present disclosure and are not intended to limit the scope of the present disclosure in any way. Alternative embodiments will become apparent to those skilled in the art to which the present disclosure pertains without departing from its spirit and scope. The scope of the present disclosure is defined by the appended claims rather than the foregoing descriptions and the exemplary embodiments described therein.

COMPONENT SYMBOL

100: electronic device
110: host computer
111, 311, 411: casing part
111a, 311a: opening
111b: internal component
120: monitor
200, 300: touchpad assembly
210: cover plate
220: touch circuit board
221: first touch electrode layer
221a: first touch unit
222: second touch electrode layer
222a: second touch unit
223: single-layer embedded coil layer
223a, 223b: coil unit
223a1, 223a2, 223b1, 223b2: straight section
224: shielding layer
224a: jump wire
225: insulting layer
226: thick arrow
230, 330: carrying mechanism
231: first carrying part
231a: through-hole
232: second carrying part
233: central accommodating portion
240: magnet group
241: silicon steel plate
250: force-supporting component
251: plastic layer
252, 253: pressure-sensitive adhesive layer (PSA layer)
260: vibration isolators
411a: recessed groove
510: adhesive component
G: pressing gap
P1, P2, P3: pressing point
Ta, T1, T2, T3: thickness
X, Y: axis
MZ: measurement zone

What is claimed is:

1. A touchpad assembly, comprising
a cover plate;
a touch circuit board disposed under the cover plate, the touch circuit board comprising a first touch electrode layer, a second touch electrode layer, and a single-layer embedded coil layer disposed away from the cover plate;
a carrying mechanism having a central accommodating portion;
a magnet group disposed in the central accommodating portion and constituting a vibration module together with the single-layer embedded coil layer, wherein a pressing gap is formed between the touch circuit board and the magnet group; and
a plurality of vibration isolators disposed between the touch circuit board and the carrying mechanism, wherein a maximum press-down deformation, when pressing on a central area of the cover plate, is from 0.3 mm to 0.7 mm; the vibration module is configured to generate a vibration acceleration from 2G to 15G; and a total thickness of the touchpad assembly is from 2.5 mm to 3.5 mm.

2. The touchpad assembly as claimed in claim 1, wherein the carrying mechanism comprises a first carrying part and a second carrying part; the first carrying part has a through-hole; the second carrying part covers the through-hole and is away from an opening of the touch circuit board; and the central accommodating portion is composed of the through-hole and the second carrying part.

3. The touchpad assembly as claimed in claim 2, wherein the first carrying part has a first thickness, the second carrying part has a second thickness, and the first thickness is larger than the second thickness.

4. The touchpad assembly as claimed in claim 3, wherein the first thickness is from 0.45 mm to 0.55 mm.

5. The touchpad assembly as claimed in claim 3, wherein the second thickness is from 0.25 mm to 0.35 mm.

6. The touchpad assembly as claimed in claim 3, wherein an upper critical value of the second thickness of the second carrying part is less than or equal to 0.5 mm.

7. The touchpad assembly as claimed in claim 2, wherein a material of the second carrying part comprises silicon steel.

8. The touchpad assembly as claimed in claim 1, wherein the vibration acceleration ranges from 3.5G to 15G.

9. The touchpad assembly as claimed in claim 8, wherein the vibration acceleration ranges from 8G to 15G.

10. The touchpad assembly as claimed in claim 1, wherein a height of each of the plurality of vibration isolators is from 0.55 mm to 0.95 mm.

11. The touchpad assembly as claimed in claim 1, wherein a non-contact load capacity between the single-layer embedded coil layer and the magnet group is larger than 110 gf.

12. The touchpad assembly as claimed in claim 1, wherein the touch circuit board comprises no more than 5 layers of metal layers.

13. The touchpad assembly as claimed in claim 1, wherein the single-layer embedded coil layer comprises two coil units, the touch circuit board further comprises a shielding layer, the shielding layer is located between the second touch electrode layer and the single-layer embedded coil layer, and the two coil units are electrically connected through the shielding layer.

* * * * *